(12) United States Patent
Batshon et al.

(10) Patent No.: US 9,900,105 B1
(45) Date of Patent: Feb. 20, 2018

(54) CODED MODULATION WITH AMPLITUDE AND PHASE-SHIFT KEYING HAVING A CIRCULAR CONSTELLATION FOR VARIABLE SPECTRAL EFFICIENCY

(71) Applicant: Tyco Electronics Subsea Communications LLC, Eatontown, NJ (US)

(72) Inventors: Hussam G. Batshon, Neptune, NJ (US); Maxim A. Bolshtyansky, Millstone, NJ (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 0 days.

(21) Appl. No.: 15/289,874

(22) Filed: Oct. 10, 2016

(51) Int. Cl.
| | | |
|---|---|---|
| H04B 10/50 | (2013.01) | |
| H04B 10/516 | (2013.01) | |
| H04B 10/54 | (2013.01) | |
| H04J 14/02 | (2006.01) | |
| H04B 10/548 | (2013.01) | |

(52) U.S. Cl.
CPC ......... *H04B 10/5161* (2013.01); *H04J 14/02* (2013.01); *H04B 10/50* (2013.01); *H04B 10/501* (2013.01); *H04B 10/505* (2013.01); *H04B 10/5055* (2013.01); *H04B 10/516* (2013.01); *H04B 10/54* (2013.01); *H04B 10/541* (2013.01); *H04B 10/548* (2013.01)

(58) Field of Classification Search
None
See application file for complete search history.

(56) References Cited

U.S. PATENT DOCUMENTS

| | | |
|---|---|---|
| 8,295,713 B2 | 10/2012 | Cai |
| 9,231,705 B1* | 1/2016 | Caton ............... H04B 10/5161 |
| 9,337,935 B2 | 5/2016 | Batshon et al. |
| 9,397,786 B2 | 7/2016 | Ihang et al. |
| 9,407,398 B2 | 8/2016 | Batshon et al. |
| 2012/0275547 A1* | 11/2012 | Cameron ............ H04L 27/3845 375/340 |
| 2014/0075271 A1* | 3/2014 | Petrov ................. H03M 13/116 714/776 |
| 2014/0079394 A1* | 3/2014 | Xie ................... H04B 10/5053 398/65 |

* cited by examiner

*Primary Examiner* — Darren E Wolf

(57) ABSTRACT

A system and method involving a coded modulation scheme using an M-APSK format with a circular constellation. A maximum achievable spectral efficiency for the transmitters may be selected and a spectral efficiency step-size of the maximum achievable spectral efficiency may be specified. The spectral efficiency for any transmitter in the system may be individually selected by reducing its spectral efficiency from the maximum achievable spectral efficiencies by a selected number of steps corresponding to the step size.

14 Claims, 7 Drawing Sheets

US 9,900,105 B1

CODED MODULATION WITH AMPLITUDE AND PHASE-SHIFT KEYING HAVING A CIRCULAR CONSTELLATION FOR VARIABLE SPECTRAL EFFICIENCY

TECHNICAL FIELD

The present disclosure relates to optical signal data detection and more particularly, to a system and method using coded modulation with amplitude phase-shift keying having a circular constellation for small step-size variable spectral efficiency.

BACKGROUND

In wavelength division multiplexed (WDM) optical communication systems, a number of different optical carrier wavelengths are separately modulated with data to produce modulated optical signals. The modulated optical signals are combined into an aggregate signal and transmitted over an optical transmission path to a receiver. The receiver detects and demodulates the data.

One type of modulation that may be used in optical communication systems is phase-shift keying (PSK). According to different variations of PSK, data is transmitted by modulating the phase of an optical wavelength such that the phase or phase transition of the optical wavelength forms a symbol representing one or more bits. Amplitude-shift keying (ASK) is another type of modulation format wherein data is transmitted by modulating the amplitude of an optical signal such that the amplitude or amplitude transition of the signal forms a symbol representing one or more bits.

Amplitude-shift keying and phase-shift keying may be combined to provide an amplitude and phase-shift keying (APSK) format. In an APSK signal, information is modulated using a combination of phase-shift keying and amplitude-shift keying, for example, to encode multiple bits per symbol. For any given M-APSK where $M=2^m$, each symbol represents m bits. For example, a 16-APSK modulation format may be used to encode 4 bits per symbol and 64-APSK may be used to encode 6 bits per symbol.

One type of APSK format is a quadrature amplitude modulation (QAM) format with a square signal constellation. A signal constellation is a predetermined plan or map indicating how information bits correspond to associated symbols modulated on an optical signal. The constellation is typically represented as a two-dimensional scatter diagram in the complex plan. The real and imaginary axes of the complex plane often called the in-phase, or I-axis, and the quadrature, or Q-axis, respectively. For a particular modulation format, the constellation identifies the exact information bits that correspond to each symbol (having real and imaginary values) modulated on an optical wavelength.

A square signal constellation is a constellation wherein the two-dimensional scatter diagram in the complex plane has a square shape. Although a QAM format may be broadly viewed as a format wherein data is represented using PSK with or without ASK, QAM formats using both PSK and ASK and having a square constellation are common. For example, a conventional 16-QAM modulation format having a square constellation uses phase shift keying and amplitude shift keying to represent four bits per symbol.

Coded modulation has been used with square constellation QAM schemes to compensate for signal degradation contributed by different sources when an optical signal is transmitted over long distances. Coded modulation involves use of a forward error correction (FEC) code. FEC is essentially the incorporation of a suitable code into a data stream at the transmitter. The transmitter receives a data stream and encodes the data stream using an FEC encoder that introduces some redundancy in the binary information sequence of the data stream. The receiver receives the encoded data and runs it through an FEC decoder to detect and correct errors.

Coded modulation QAM schemes with square constellations have also been used in flexi-rate transponder technology wherein multiple data rates may be achieved over the same bandwidth (or symbol rate) using different spectral efficiency (bits/sec/Hz). Examples of coded modulation QAM schemes having square constellations useful in providing variable spectral efficiency (SE) are described in U.S. Pat. No. 9,337,935, the teachings of which are hereby incorporated herein by reference.

BRIEF DESCRIPTION OF THE DRAWINGS

Reference should be made to the following detailed description which should be read in conjunction with the following figures, wherein like numerals represent like parts.

DETAILED DESCRIPTION

In general, a system and method consistent with the present disclosure involves a coded modulation scheme using an M-APSK modulation format with a circular constellation. As used herein a "circular constellation" is a constellation wherein the two-dimensional scatter diagram in the complex plane forming the constellation has a circular shape with constellation points arranged in a single ring or concentric rings.

Advantageously, a coded modulation scheme using a M-APSK modulation format with a circular constellation provides high spectral efficiency and with a low signal peak-to-average power ratio (PAPR), e.g. compared to coded modulation scheme using a M-QAM modulation format having a square constellation. A signal with a low PAPR is more robust against nonlinear impairments associated with the transmission path. In addition, to approach channel capacity over a power-limited AWGN channel, the input signal should follow a Gaussian distribution. A coded modulation scheme using a M-APSK modulation format with a circular constellation has a point distribution that is much closer to a Gaussian distribution, e.g. compared to a coded modulation scheme using a M-QAM modulation format having a square constellation, and allows a closer realization of channel capacity.

Also, in a system and method consistent with the present disclosure different spectral efficiencies may be achieved for different transmitters in a WDM system using the same M-APSK modulation format with a circular constellation. A maximum achievable spectral efficiency, e.g. bit rate, for the transmitters may be selected and a spectral efficiency step-size of the maximum achievable spectral efficiency may be specified. The spectral efficiency for any transmitter in the system may be individually selected by reducing the spectral efficiency of the transmitter from the maximum achievable spectral efficiency by a selected number of steps corresponding to the step size. A number of encoding bits equal to the selected number of steps may be inserted into a data stream to establish blocks of bits at the transmitter. The encoding bits may be one or more parity bits indicating a parity of at least a portion of the block bits, or a combination of parity bits and one or more constant value bits. Each of the blocks of bits are mapped, e.g. Gray mapped, to associated M-APSK symbols that are modulated onto an optical carrier and transmitted to a receiver.

Figure 1:
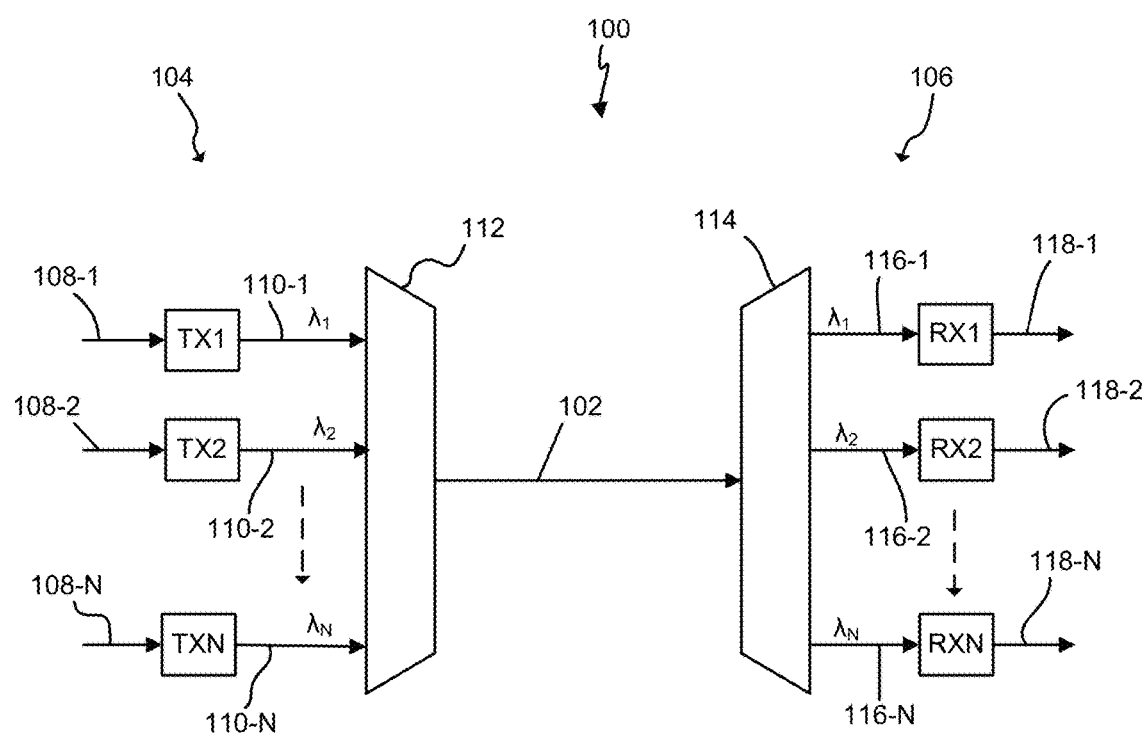
FIG. 1 is a block diagram of one exemplary embodiment of a system consistent with the present disclosure.

FIG. 1 is a simplified block diagram of one exemplary embodiment of a WDM transmission system 100 consistent with the present disclosure. The transmission system serves to transmit a plurality of optical channels over an optical information path 102 from a transmitting terminal 104 to one or more remotely located receiving terminals 106. The exemplary system 100 may be a long-haul submarine system configured for transmitting the channels from a transmitter to a receiver at a distance of 5,000 km, or more. Although exemplary embodiments are described in the context of an optical system and are useful in connection with a long-haul WDM optical system, the broad concepts discussed herein may be implemented in other communication systems transmitting and receiving other types of signals.

Those skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receives a data signal on an associated input port 108-1, 108-2 . . . 108-N, and transmits the data signal on an associated wavelength $\lambda_1, \lambda_2 \ldots \lambda_N$. The transmitters TX1, TX2 . . . TXN may be configured to modulate data on its associated wavelength $\lambda_1, \lambda_2 \ldots \lambda_N$ using an associated spectral efficiency in a variable spectral efficiency configuration consistent with the present disclosure. The transmitters TX1, TX2 . . . TXN, of course, are shown in highly simplified form for ease of explanation. Those skilled in the art will recognize that each transmitter TX1, TX2 . . . TXN may include electrical and optical components configured for transmitting the data signal at its associated wavelength $\lambda_1, \lambda_2 \ldots \lambda_N$ with a desired amplitude and modulation.

The transmitted wavelengths $\lambda_1, \lambda_2 \ldots \lambda_N$ or channels are respectively carried on a plurality of paths 110-1, 110-2 . . . 110-N. The data channels are combined into an aggregate signal on optical path 102 by a multiplexer or combiner 112. The optical information path 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1, \lambda_2 \ldots \lambda_N$ onto associated paths 116-1, 116-2 . . . 116-N coupled to associated receivers RX1, RX2 . . . RXN. One or more of the receivers RX1, RX2 . . . RXN may be configured to demodulate the transmitted signal using iterative decoding and may provide an associated output data signal on an associated output path 118-1, 118-2, 118-3, 118-N.

In general, in a system or method consistent with the present disclosure, one or more of the transmitters TX1, TX2 . . . TXN may be configured to use a coded modulation scheme using an M-APSK modulation format with a circular constellation, where $M=2^m$ and each M-APSK symbol represents m bits. As discussed above, a coded modulation scheme using an M-APSK modulation format with a circular constellation provides low PAPR, which is impacted less by nonlinear impairments associated with the transmission path compared to a signal with a higher PAPR. In addition, such a coded modulation scheme provides an input signal that is closer to a Gaussian distribution than a scheme using a square constellation which allows for a closer approximation of channel capacity.

Figure 2:
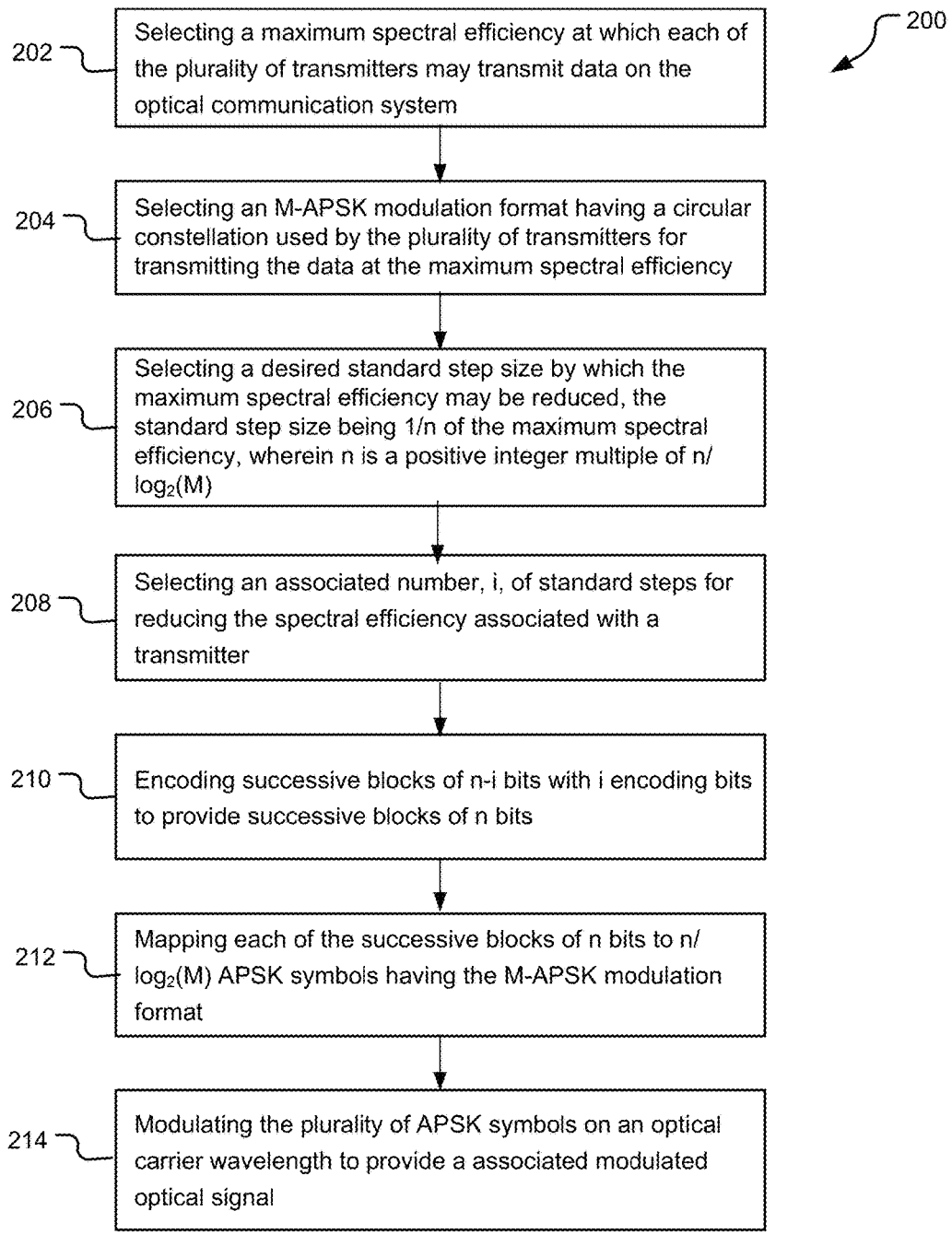
FIG. 2 is flow chart illustrating one example of a method consistent with the present disclosure.

In addition in some embodiments all of the transmitters TX1, TX2 . . . TXN may be configured to use a coded modulation M-APSK modulation format with a circular constellation, baud rate (symbol rate) and forward error correction (FEC) scheme, but the spectral efficiencies of one or more of the transmitters TX1, TX2 . . . TXN may be selectively reduced compared to a maximum achievable spectral efficiency by one or more step sizes. FIG. 2, for example, is a flow chart illustrating a method 200 consistent with the present disclosure. While FIG. 2 illustrates various operations according to an embodiment, it is to be understood that not all of the operations depicted in FIG. 2 are necessary for other embodiments. Indeed, it is fully contemplated herein that in other embodiments of the present disclosure, the operations depicted in FIG. 2, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

In operations 202, 204, and 206, respectively, a maximum achievable spectral efficiency (e.g. bit rate), a coded modulation scheme with an M-APSK modulation format having a circular constellation, and a desired standard step-size, 1/n, by which the maximum achievable spectral efficiency may be reduced are selected for the transmitters. The value of n, which determines the step size, may be a positive integer multiple of $\log_2$ (M), which is the number of bits represented by each symbol in an M-APSK modulation format.

For each transmitter in the system, an associated number, i, of standard steps for reducing the spectral efficiency of the transmitter from the maximum achievable spectral efficiency may be selected 208. Successive blocks of n-i bits may be encoded 210 with a number, i, of encoding bits equal to the selected number of steps to produce blocks of n bits (n-i information bits, plus i encoding bits associated with the n information bits). Each of the successive blocks of n bits are mapped 212, e.g. Gray mapped, to $n/\log_2$ (M) associated M-APSK symbols that are modulated 214 onto an optical carrier to provide a modulated optical signal for transmission to a receiver. Mapping of blocks of bits to associated M-APSK symbols can be performed in a variety of ways. As used herein a "Gray map" or "Gray mapping" refers to the known Gray mapping scheme whereby a code is assigned to each of a contiguous set of bits such that adjacent code words differ by one bit and does not involve adding additional bits to a data stream (i.e. Gray mapping has no overhead).

Figure 3:
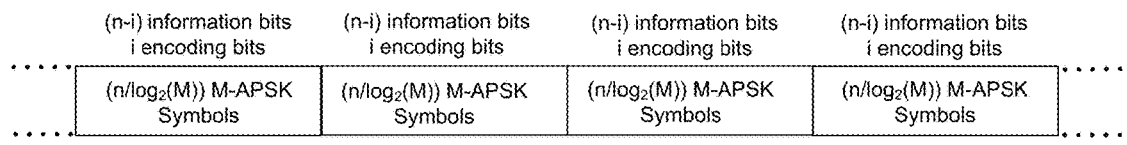
FIG. 3 diagrammatically illustrates a modulated output of an exemplary transmitter consistent with the present disclosure.

FIG. 3 diagrammatically illustrates the output of a transmitter TX1, TX2 . . . TXN implementing a system and method consistent with the present disclosure. As shown, at each transmitter, a different number, i, of encoding bits may be added to blocks of n-i bits. A different number, i, of encoding bits may be added at each transmitter to reduce the spectral efficiency of the transmitter compared to a maximum achievable spectral efficiency by an associated selected number of steps corresponding to a step size, 1/n. The blocks of n bits (n-i information bits plus i encoding bits) are then mapped, e.g. Gray mapped, to $n/\log_2$ (M) associated M-APSK symbols and modulated on an optical carrier. Since the blocks of bits are mapped to multiple M-APSK symbols, and each M-APSK symbol is 2-dimensional (phase and amplitude), the blocks of bits may be considered as being mapped to a multi-dimensional constellation point having $2^S$ dimensions, where $S=n/\log_2$ (M) is the number of M-APSK symbols used to map the blocks of bits.

The encoding bits in a system or method consistent with the present disclosure may be parity bits or a combination of parity bits and constant value bits. Parity bits indicate, in a known manner, the parity of at least a portion of an associated block of bits. As is known, a parity bit may be an even parity bit or an odd parity bit. When using even parity, the parity bit is set to a value of one if the number of ones in the bits (not including the parity bit) associated with the parity bit is odd. If the number of ones in the bits associated with the parity bit is already even, the even parity bit is set to a 0. When using odd parity, the parity bit is set to 1 if the number of ones in the bits (not including the parity bit) associated with the parity bit is even. When the number of ones in the in the bits associated with the parity bit is already odd, the odd parity bit is set to 0.

Constant value bits have a constant "1" or "0" value and may be included along with one or more parity bits to improve the power efficiency of the modulation, e.g. when adding additional parity bits has little or no additional benefit. Using the constant value bits lowers the average power per symbol in a system or method consistent with the present disclosure, which improves signal-to-noise ratio (SNR) performance when combined with maximizing the minimum Euclidean distance using parity bits. Also, depending on the location of the constant value bit(s) in a Gray mapped M-APSK symbol, the symbol is constrained to a specific group of constellation points. This constraint may be used by the receiver to demodulate the symbol.

In a system and method consistent with the present disclosure the M-APSK format may have a circular constellation, wherein each ring of the constellation has uniformly spaced constellation points and each constellation point represents m bits, where $M=2^m$. In an embodiment using single parity check (SPC) encoding bit(s), an M-APSK modulation format, with $M=2^m$ may be used with m=a+p, where $2^a$ is the number of concentric rings (amplitudes) in the constellation and $2^p$ is the number of uniformly spaced constellation points per ring. If Gray mapping is used to map the encoded bits to constellation points, all the rings in the M-APSK constellation may have the same number of constellation points.

Figure 4:
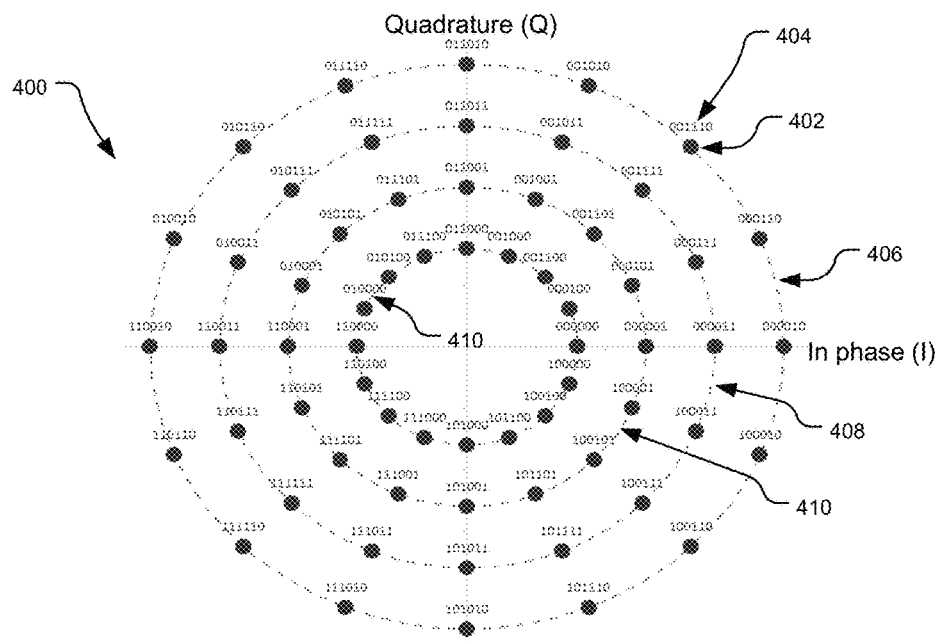
FIG. 4 is a constellation diagram illustrating a 64-APSK modulation format with Gray mapping consistent with the present disclosure.

FIG. 4, for example, includes a constellation diagram 400 illustrating Gray mapping of a 64-APSK modulated signal. The constellation diagram 400 of FIG. 4 includes 64 constellation points, e.g. point 402, indicating the amplitude and phase of each M-APSK symbol that may be represented using a Gray mapped 64-APSK modulation format, along with the 6 bits (code word) associated with the symbol, e.g. code word 404. In this example, $M=2^m=64$ and m=6 indicating there are 6 bits represented by each symbol, and m=a+p with a=2 and p=4 to provide $2^2=4$ concentric rings (following dashed lines 406, 408, 410 and 412, respectively) and $2^4=16$ constellation points in each ring. In the illustrated embodiment, Gray mapping uses the convention of the 4 Most Significant Bits (MSBs) select the phase of the constellation point and the 2 Least Significant Bits (LSBs) select the ring (amplitude) for the constellation point. The radii of the rings can be optimized using the encoding bits code to maximize the minimum Euclidean distance between adjacent multi-dimensional symbols.

Figure 5:
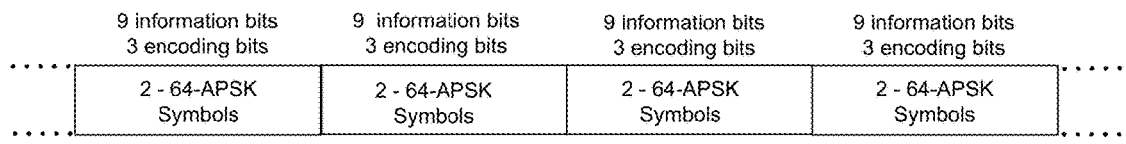
FIG. 5 diagrammatically illustrates a modulated output of an exemplary transmitter using a 4D-9/12-64APSK modulation consistent with the present disclosure.

With reference to the general transmitter output shown in FIG. 3, an example of a transmitter output using a 64-APSK modulated signal (M=64) with a circular constellation, as shown in FIG. 4 with 9 information bits (n=9) and 3 encoding bits (i=3) is diagrammatically illustrated in FIG. 5. In the illustrated example, 12 bits (9 information bits and 3 encoding bits) are mapped to two different 64-APSK symbols. The 12 bits can be associated with consecutive bits in time, or in polarization if polarization multiplexing is used. Since 12 bits are mapped to 2 M-APSK symbols, and each M-APSK symbol is 2-dimensional (phase and amplitude), the 12 bits may be considered as being mapped to a 4-dimensional (4D) constellation point, and the specific embodiment illustrated in FIG. 5 may be referred to as a 4D-9/12-64-APSK modulation symbol.

Figure 6:
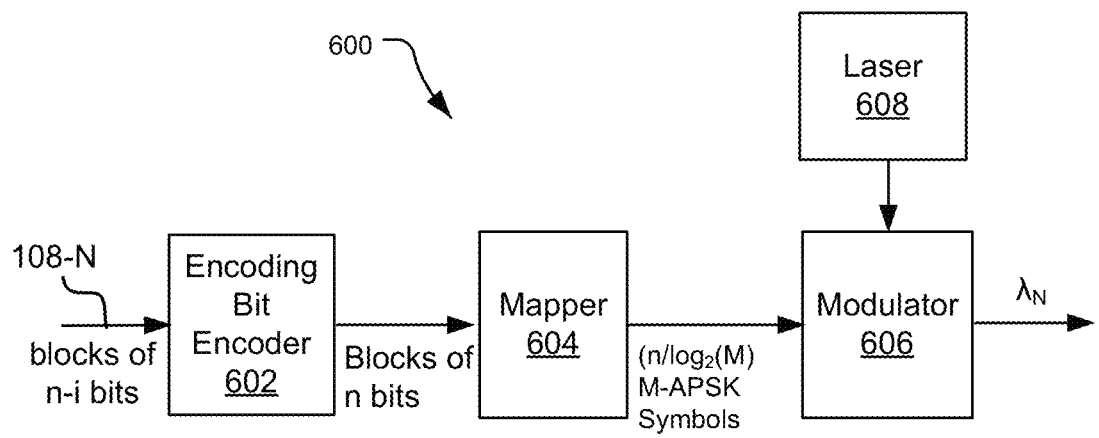
FIG. 6 is a block diagram of one exemplary embodiment of a transmitter consistent with the present disclosure.

FIG. 6 is a simplified block diagram of one exemplary transmitter 600 consistent with the present disclosure. The illustrated exemplary embodiment 600 includes an encoding bit encoder 602, a mapper 604, and a modulator 606 for modulating the output of a continuous-wave laser 608 for providing a coded and modulated output on a carrier wavelength $\lambda_N$. The encoding bit encoder 602 may be configured to encode each block of n-i information bits (e.g. data bits, FEC overhead, pilot symbols) of a data stream provided on input path 108-N with i associated encoding bits to achieve a desired reduction in spectral efficiency, as described above. The output of the encoding bit encoder 602 includes successive blocks of n bits, i.e. n-i information bits plus i encoding bits.

The encoded output of the encoding bit encoder is coupled to the mapper 604. The mapper 604 is configured to map each block of n bits to $n/\log_2$ (M) associated M-APSK symbols using any mapping convention such as, for example, Gray mapping. The M-APSK symbols associated with each block of n bits are modulated onto an optical carrier wavelength $\lambda_N$ of the continuous-wave laser 608 using the modulator 606. The modulator 606 may modulate the plurality of M-APSK symbols onto the carrier wavelength $\lambda_N$ using any known modulation method. The encoded, mapped and modulated output of the modulator 606 may be coupled to the multiplexer 112 (FIG. 1) in a WDM system.

Figure 7:
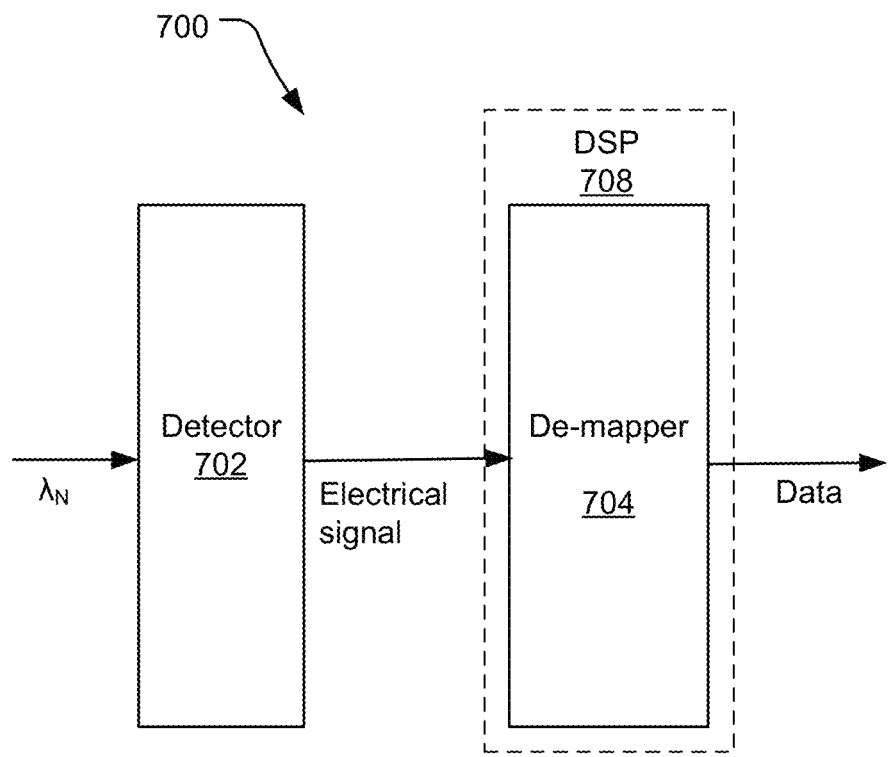
FIG. 7 is a block diagram of one exemplary embodiment of a receiver consistent with the present disclosure.

FIG. 7 is a simplified block diagram of one exemplary receiver 700 consistent with the present disclosure. The illustrated exemplary embodiment 700 includes an optical signal detector 702 and a de-mapper 704. The detector 702 may include a known coherent receiver, e.g. a polarization diversity coherent receiver, configured to receive the signal on the optical carrier wavelength $\lambda_N$ and convert the optical signal into one or more associated electrical outputs (e.g. an output associated with each polarization in a polarization multiplexed modulation format) representative of the M-APSK symbols modulated on the optical carrier wavelength $\lambda_N$ by the modulator 606 (FIG. 6).

The de-mapper 704 may be configured as a portion of a digital signal processing (DSP) circuit 708. In general, DSP involves processing of signals using one or more application specific integrated circuits (ASICS) and/or special purpose processors configured for performing specific instruction sequences, e.g. directly and/or under the control of software instructions. One example of a receiver incorporating a detector, i.e. a coherent receiver, and a DSP circuit using carrier phase estimation for processing the digital outputs of the coherent receiver is described in U.S. Pat. No. 8,295,713, the teachings of which are hereby incorporated herein by reference.

With reference to both FIGS. 6 and 7, the DSP circuit 708 may process the output of the detector 702 and provide an output that reproduces data provided at the input 108-N to the transmitter 600. The de-mapper 704 receives the electrical output of the detector 702, reverses the mapping applied by the mapper 604, and removes the encoding bits applied by the encoding bit encoder 602. The output of the de-mapper is a de-mapped output representative of the successive blocks of n-i bits of data provided at the input 108-N to the transmitter 600.

De-mapping may be performed, for example using a maximum a posteriori (MAP) decoder, and may be performed iteratively in response to a priori log likelihood ratio (LLR) feedback from the output of the receiver. The de-mapper 704 in a system consistent with the present disclosure may cause correction of cycle slip using parity indicated by parity bits applied by the encoding bit encoder 602. In some embodiments, for example, the de-mapper 704 may use the parity bits to perform de-mapping in a manner that automatically causes correction of cycle slip.

Figure 8:
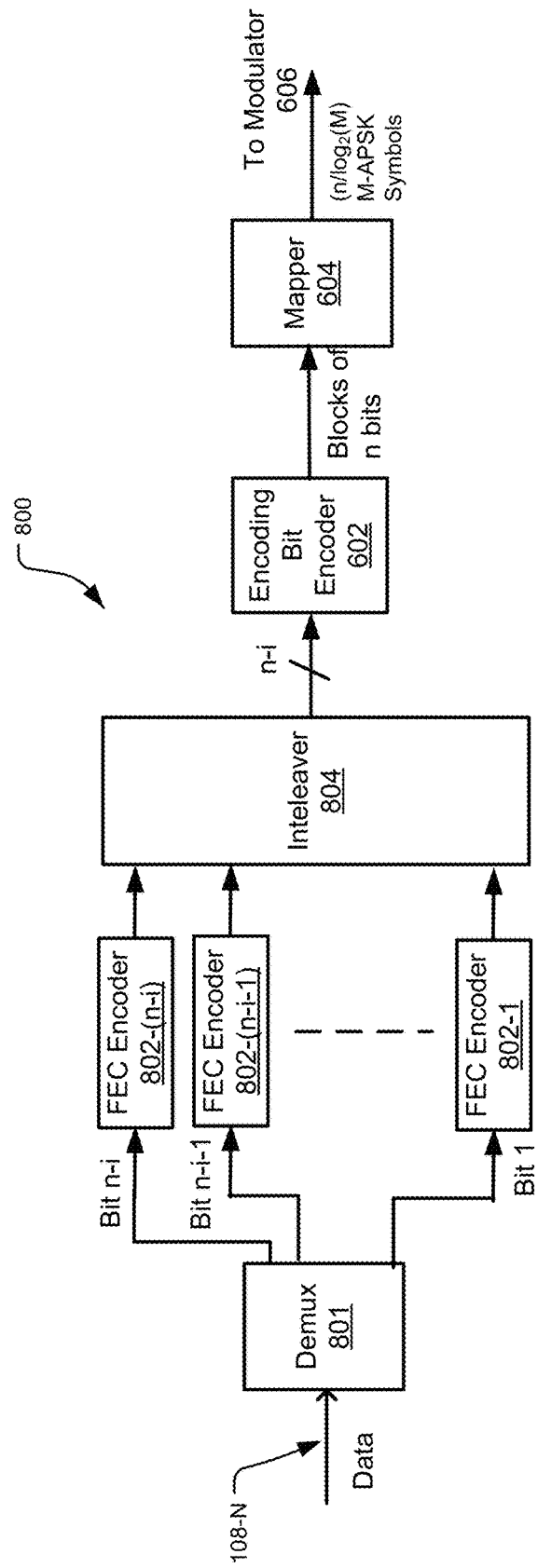
FIG. 8 is a block diagram of another exemplary embodiment of a transmitter consistent with the present disclosure.

A system consistent with the present disclosure may be implemented in a variety of configurations. FIG. 8 is a simplified block diagram of one exemplary transmitter 800 consistent with the present disclosure. The illustrated exemplary embodiment 800 includes a demultiplexer 801, a plurality of FEC encoders 802-(n-i), 802-(n-i-1) . . . 802-1, an interleaver 804, an encoding bit encoder 602, and a mapper 604 for driving a modulator 606 as described in connection with FIG. 6.

The demultiplexer 801 may take a known configuration for receiving a serial input data stream on path 108-N and demultiplexing the input data stream into n-i separate parallel demultiplexed data streams. Each of the n-i data streams are coupled to an associated one of the FEC encoders 802-(n-i), 802-(n-i-1) . . . 802-1. The FEC encoders 802-(n-i), 802-(n-i-1) . . . 802-1 may each be configured to encode the data stream received thereby with an associated FEC code to provide an associated FEC encoded output.

Numerous FEC codes are known, each with different properties related to how the codes are generated and consequently how they perform. Examples of known error correcting codes include the linear and cyclic Hamming codes, the cyclic Bose-Chaudhuri-Hocquenghem (BCH) codes, the convolutional (Viterbi) codes, the cyclic Golay and Fire codes, Turbo convolutional and product codes (TCC, TPC), and low density parity check codes (LDPC). A parity check code such as a single parity check (SPC) code is another well-known FEC code. Hardware and software configurations for implementing various error correcting codes in the FEC encoders 802-(n-i), 802-(n-i-1) . . . 802-1 and corresponding decoders 802-(n-i), 802-(n-i-1) . . . 802-1 (FIG. 9) are known to those of ordinary skill in the art.

The encoded output of each of the FEC encoders 802-(n-i), 802-(n-i-1) . . . 802-1 is coupled to the interleaver 804. A variety of interleaver configurations are known. In the illustrated embodiment, the interleaver 804 receives n-i output code words from the FEC encoders 802-(n-i), 802-(n-i-1) . . . 802-1 and provides a parallel interleaved output of n-i bits to the encoding bit encoder 602.

As described above, the encoding bit encoder 602 may be configured to encode each block of n-i bits with i associated parity bits. The output of the encoding bit encoder 602 includes successive blocks of n bits, i.e. n-i information bits plus i parity bits. The encoded output of the encoding bit encoder 602 is coupled to the mapper 604. The mapper 604 is configured to map each block of n bits to n/log$_2$ (M) associated M-APSK symbols, e.g. using Gray mapping. The M-APSK symbols associated with each block of n bits are provided to the modulator 606 for modulating the symbols onto an optical carrier wavelength $\lambda_N$ of a continuous-wave laser 608.

Figure 9:
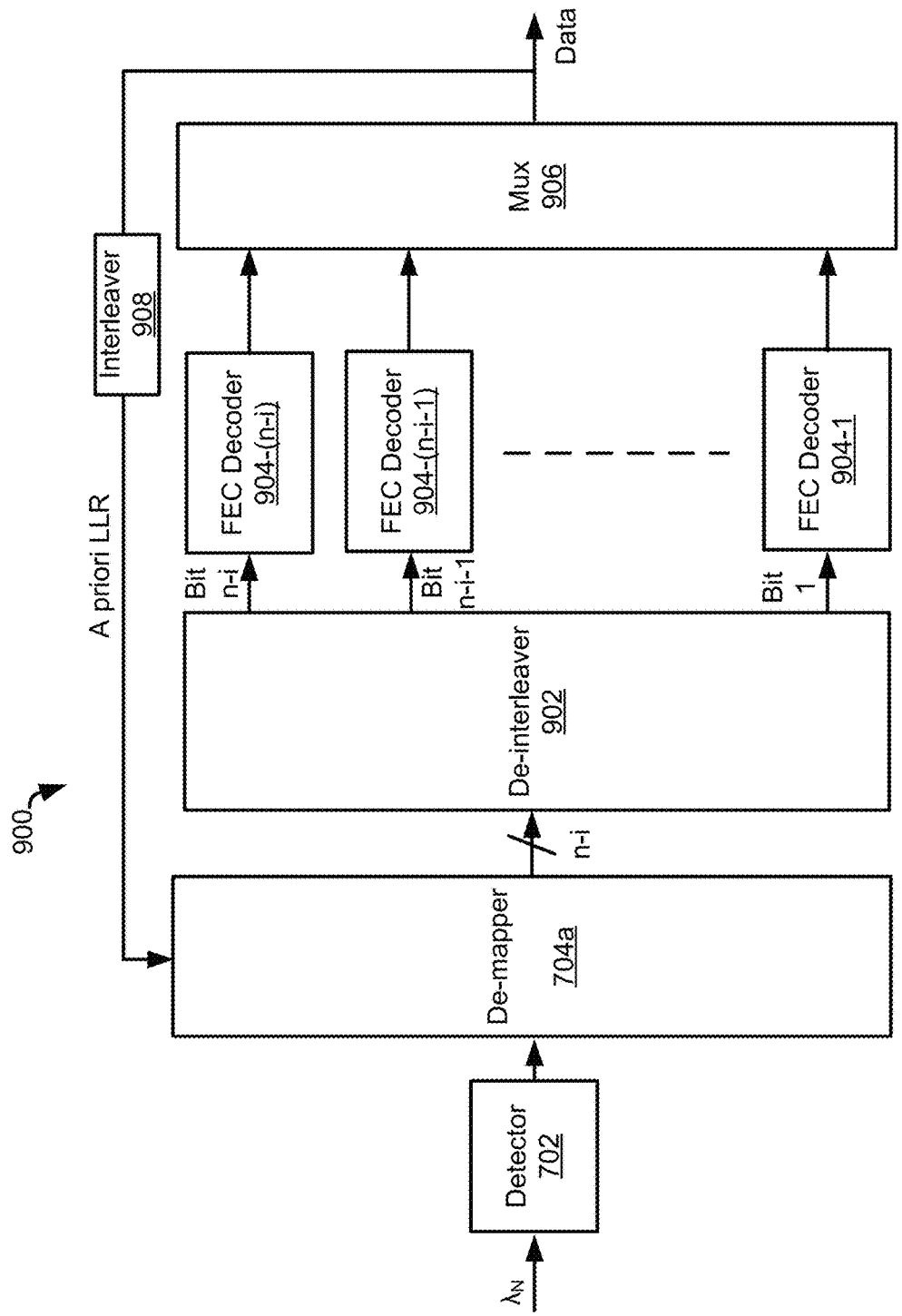
FIG. 9 is a block diagram of another exemplary embodiment of a receiver consistent with the present disclosure.

FIG. 9 is a simplified block diagram of one exemplary receiver 900 consistent with the present disclosure for receiving a signal modulated using the transmitter 800 shown in FIG. 8. The illustrated exemplary embodiment 900 includes a detector 702, a de-mapper 704*a*, a de-interleaver 902, a plurality of FEC decoders 904-(n-i), 904-(n-i-1) . . . 904-1, a multiplexer 906, and an interleaver 908.

As described above, the detector 702 is configured to receive the optical signal modulated on the carrier wavelength $\lambda_N$ and to convert the optical signal into an electrical signal. The de-mapper 704*a* receives the output of the detector 702 and reverses the mapping of data to the modulation format imparted by the mapper 604 at the transmitter and removes the encoding bits applied by the encoding bit encoder, e.g. using a MAP decoder as described above. As shown, de-mapping may be performed iteratively in response to a priori LLR feedback from the output of the receiver, i.e. the output of the multiplexer 906 in the illustrated embodiment. The de-mapper 704*a* provides a de-mapper output including blocks of n-i bits, reproducing the output of the interleaver 804 in the transmitter 800.

The de-mapper output of the de-mapper 704*a* is coupled to the de-interleaver 902 which reverses the bit-interleaving performed by the associated interleaver 804 in the transmitter 800 and provides n-i associated de-interleaved outputs to the FEC decoders 904-(n-i), 904-(n-i-1) . . . 904-1. The FEC decoders 904-(n-i), 904-(n-i-1) . . . 904-1 may each be configured to decode the data stream received thereby using the FEC code applied at the transmitter 800 to provide associated FEC decoded outputs. The n-i FEC decoded outputs of each of the FEC decoders 904-(n-i), 904-(n-i-1) . . . 904-1 are coupled to a known multiplexer 906. The multiplexer 906 multiplexes outputs of the FEC code decoders 904-(n-i), 904-(n-i-1) . . . 904-1 to produce a serial digital data output that reproduces the data on path 108-N at the transmitter 800.

The data output of the multiplexer 906 is fed back to the de-mapper 704a through the interleaver 908 to provide a priori LLR information used by the de-mapper 704a in decoding the input thereto. The interleaver 908 essentially reverses the de-interleaving performed by the de-interleaver 902.

The encoding bit encoder 602 in a system consistent with the present invention may insert parity bits and/or encoding bits at any bit position within a mapped M-APSK symbol, and the de-mapper 704, 704a may be configured to de-map the received signal based on the location and/or parity associated with the encoding bits. Also, any parity bit encoded by the encoding bit encoder may identify parity of any associated portion of a block of bits.

For example, in an embodiment wherein a transmitter is configured to provide a 4D-9/12-64APSK symbol, as illustrated in FIG. 5, the symbol represents 12 bits (9 information bits and 3 encoding bits) and may be considered to have the following bit representation:

$$X_1 X_2 X_3 X_4 | X_5 P_6 X_7 X_8 X_9 P_{10} | X_{11} P_{12}$$

where X is used to refer to an information bit and P is used to refer to an encoding bit (in this case multi-stage SPC). The subscript adjacent each X and P identifies the bit location. The coding rules applied by the encoding bit encoder in this example may be:

$$P_6 = X_1 \oplus X_2 \oplus X_3 \oplus X_4 \oplus X_5 \oplus 1$$

$$P_{10} = X_1 \oplus X_2 \oplus X_3 \oplus X_4 \oplus X_7 \oplus X_8 \oplus X_9 \oplus 1$$

$$P_{12} = X_5 \oplus P_6 \oplus X_{11}$$

where $\oplus$ is modulo 2 addition.

Advantageously therefore, there is provided a system and method using a coded modulation scheme using an M-APSK modulation format with a circular constellation. Such a modulation scheme has a lower PAPR and provides an input signal closer to a Gaussian distribution compared to conventional QAM formats with square constellations, which makes the scheme more robust to nonlinear impairments caused by the transmission path and allows a closer approximation of a maximum channel capacity. In addition, the scheme allows for different spectral efficiencies to be achieved for different transmitters in a WDM system using the same M-APSK modulation format with a circular constellation. This flexibility allows for a small constant step in information bit rates, and also allows for a unified interface and a unified digital signal processing (DSP) for the transmitters and receivers throughout the different achievable spectral efficiencies. All the transmitter and receiver pairs in the system may include the same basic configuration. A change from one spectral efficiency to another for a particular transmitter and receiver pair can be accomplished simply by changing the encoding bit rules established in the transmitter and receiver. The unified DSP helps in maintaining a reasonable complexity in the system hardware design.

Figure 10:
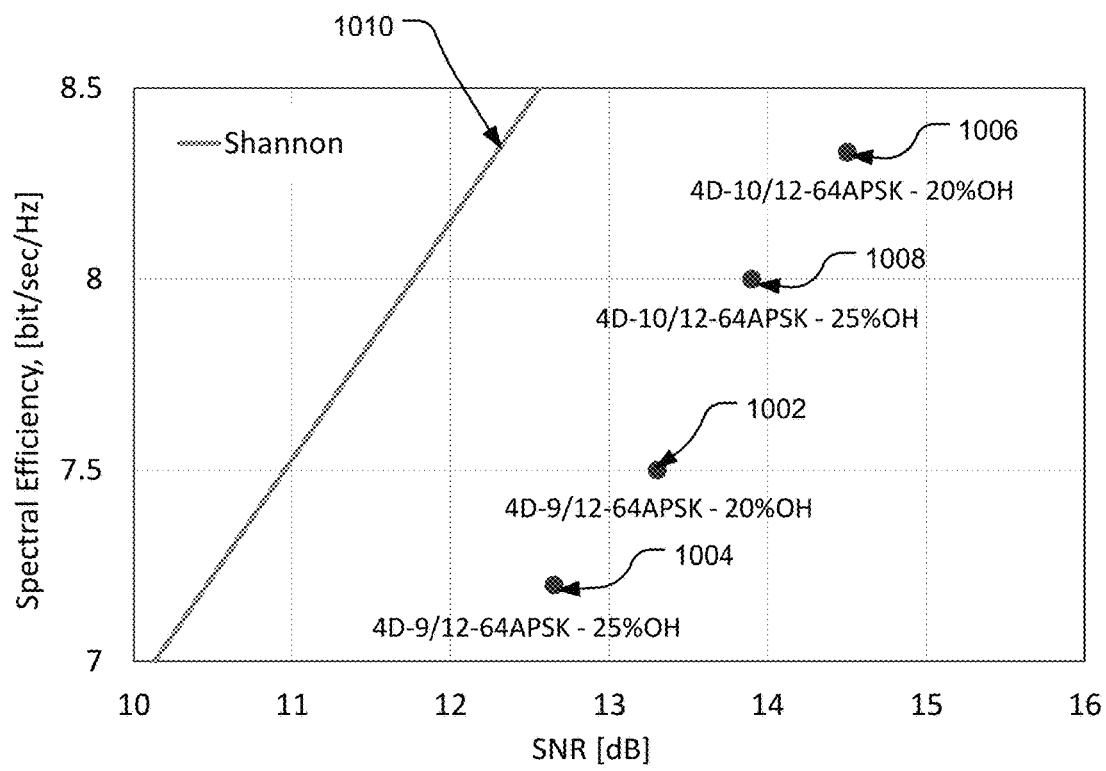
FIG. 10 is a plot of SNR vs. spectral efficiency illustrating performance of an exemplary system consistent with the present disclosure.

Additional flexibility can be provided in a system and method consistent with the present disclosure by configuring the transmitter and receivers to implement more than one option for the FEC codes. All the transmitter and receiver pairs in the system may include the same basic configuration and a change from one FEC code to another for a particular transmitter and receiver pair can be accomplished simply by changing the FEC code selection in the transmitter and receiver. Such a configuration allows selection of performance criteria through selection of the FEC code. FIG. 10, for example, includes a plots 1002, 1004, 1006 and 1008 of SNR vs. spectral efficiency (bits/sec/Hz) associated with a systems consistent with the present disclosure using different FEC codes and also includes a plot 1010 illustrating the Shannon limit. In particular, plots 1002 and 1004 show SNR vs. spectral efficiency for a system consistent with the present disclosure using a 4D-9/12-64APSK modulation (e.g. as illustrated in FIG. 5) with FEC codes having 20% (plot 1002) and 25% (plot 1004) overhead, respectively. Plots 1006 and 1008 show SNR vs. spectral efficiency for a system consistent with the present disclosure using a 4D-10/12-64APSK modulation with FEC codes having 20% (point 1006) and 25% (point 1008) overhead, respectively. As shown, performance of any selected spectral efficiency in a system consistent with the present disclosure generally is generally equidistant from the Shannon limit plot 1010.

According to one aspect of the disclosure, there is provided a system including a plurality of optical signal transmitters, each of the optical signal transmitters being configured to modulate data using an M-APSK modulation format having a circular constellation. Each of the transmitters includes: an encoding bit encoder configured to encode successive blocks of n-i bits with a selected number, i, of encoding bits to provide successive blocks of n bits; a Gray mapper coupled to the encoding bit encoder and configured to map each one of the blocks of n bits to $n/\log_2(M)$ APSK symbols having the M-APSK modulation format having circular constellation; and a modulator coupled to the Gray mapper and configured to modulate an optical signal in response to an output of the Gray mapper to provide a modulated optical signal including the APSK symbols.

According to another aspect of the disclosure there is provided a method of providing variable spectral efficiency for a plurality of transmitters in an optical communication system, the method including: selecting a maximum spectral efficiency at which each of the plurality of transmitters may transmit data on the optical communication system; selecting an M-APSK modulation format having a circular constellation used by the plurality of transmitters for transmitting the data at the maximum spectral efficiency; selecting a desired standard step size by which the maximum spectral efficiency may be reduced, the standard step size being 1/n of the maximum spectral efficiency, wherein n is a positive integer multiple of $\log_2(M)$; and for each of the plurality of transmitters, selecting an associated number, i, of standard steps for reducing the spectral efficiency associated with the transmitter; encoding successive blocks of n-i bits with i encoding bits to provide successive blocks of n bits; Gray mapping each of the successive blocks of n bits to $n/\log_2(M)$ APSK symbols having the M-APSK modulation format having a circular constellation; and modulating the plurality of APSK symbols on an optical carrier wavelength to provide an associated modulated optical signal.

Embodiments of the methods described herein may be implemented using a processor and/or other programmable device. To that end, the methods described herein may be implemented on a tangible, computer readable storage medium having instructions stored thereon that when executed by one or more processors perform the methods. Thus, for example, the transmitter and/or receiver may include a storage medium (not shown) to store instructions (in, for example, firmware or software) to perform the operations described herein. The storage medium may include any type of non-transitory tangible medium, for example, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. As used in any embodiment herein, "circuitry" may comprise, for example, singly or in any combination, hardwired circuitry, programmable circuitry, state machine circuitry, and/or firmware that stores instructions executed by programmable circuitry. In at least one embodiment, the transmitter and receiver may comprise one or more integrated circuits. An "integrated circuit" may be a digital, analog or mixed-signal semiconductor device and/or microelectronic device, such as, for example, but not limited to, a semiconductor integrated circuit chip.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system comprising:
    a plurality of optical signal transmitters, each of said optical signal transmitters being configured to modulate data using an M-APSK modulation format having a circular constellation and each of said transmitters comprising:
    an encoding bit encoder configured to encode successive blocks of n-i bits with a selected number, i, of encoding bits to provide successive blocks of n bits;
    a mapper coupled to said encoding bit encoder and configured to map each one of said blocks of n bits to n/log 2(M) amplitude and phase-shift keying (APSK) symbols having said M-APSK modulation format having a circular constellation; and
    a modulator coupled to said mapper and configured to modulate an optical signal in response to an output of said mapper to provide a modulated optical signal comprising said APSK symbols;
    wherein i>=1, and n>1.

2. A system according to claim 1, wherein said number, i, of encoding bits is a different number for at least two of said plurality of transmitters.

3. A system according to claim 1, wherein said i encoding bits comprises at least one parity bit indicating parity of at least a portion of said n bits.

4. A system according to claim 1, wherein said i encoding bits comprises at least one bit having a predetermined constant value.

5. A system according to claim 1, wherein said i encoding bits consists of a first number of parity bits indicating parity of at least a portion of said n bits and a second number of predetermined bits having a predetermined constant value.

6. A system according to claim 1, wherein said M-APSK modulation format having a circular constellation is a 64-APSK modulation format.

7. A system according to claim 1, wherein said mapper is Gray mapper.

8. A method of providing variable spectral efficiency for a plurality of transmitters in an optical communication system, said method comprising:
    selecting a maximum spectral efficiency at which each of said plurality of transmitters may transmit data on said optical communication system;
    selecting an M-APSK modulation format having a circular constellation used by said plurality of transmitters for transmitting said data at said maximum spectral efficiency;
    selecting a desired standard step size by which said maximum spectral efficiency may be reduced, said standard step size being 1/n of said maximum spectral efficiency, wherein n is a positive integer multiple of log 2(M); and
    for each of said plurality of transmitters,
        selecting an associated number, i, of standard steps for reducing said spectral efficiency associated with said transmitter;
        encoding successive blocks of n-i bits with i encoding bits to provide successive blocks of n bits;
        mapping each of said successive blocks of n bits to n/log 2(M) APSK symbols having said M-APSK modulation format having a circular constellation; and
        modulating said plurality of APSK symbols on an optical carrier wavelength to provide an associated modulated optical signal;
        wherein i>1, and n>i.

9. A method according to claim 8, wherein said number, i, of standard steps is a different number for at least two of said plurality of transmitters.

10. A method according to claim 8, wherein said i encoding bits comprises at least one parity bit indicating parity of at least a portion of said n bits.

11. A method according to claim 8, wherein said i encoding bits comprises at least one bit having a predetermined constant value.

12. A method according to claim 8, wherein said i encoding bits consists of a first number of parity bits indicating parity of at least a portion of said n bits and a second number of predetermined bits having a predetermined constant value.

13. A method according to claim 8, wherein said M-APSK modulation format having a circular constellation is a 64-APSK modulation format.

14. A method according to claim 8, wherein said mapping is Gray mapping.

* * * * *